(12) United States Patent
Rambosek

(10) Patent No.: US 6,345,779 B1
(45) Date of Patent: Feb. 12, 2002

(54) DATA STORAGE CARTRIDGE HAVING A RETAINER FOR A LEADER PIN

(75) Inventor: G. Phillip Rambosek, Shafer, MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 09/476,623

(22) Filed: Dec. 31, 1999

(51) Int. Cl.$^7$ .............................................. G03B 23/02
(52) U.S. Cl. .................................... 242/348.2; 360/132
(58) Field of Search .............................. 242/348, 348.2, 242/332.4, 332.3, 342, 532.1, 532.5; 360/132

(56) References Cited

U.S. PATENT DOCUMENTS

| | | | |
|---|---|---|---|
| 4,383,660 A | | 5/1983 | Richard et al. |
| 4,577,811 A | | 3/1986 | Bray et al. |
| 5,303,875 A | | 4/1994 | Hoge et al. |
| 5,465,187 A | | 11/1995 | Hoge et al. |
| 5,492,284 A | * | 2/1996 | Sorensen ................. 242/348.2 |
| 5,868,338 A | * | 2/1999 | Martin et al. ............... 242/348 |

FOREIGN PATENT DOCUMENTS

| | | | | |
|---|---|---|---|---|
| DE | 2911835 | * | 10/1979 | ................ 242/348 |
| DE | 2912423 | * | 10/1980 | ................ 242/348 |
| EP | 0 924 701 A2 | | 6/1999 | |
| EP | 0 924 703 A1 | | 6/1999 | |
| EP | 0 926 675 A1 | | 6/1999 | |
| EP | 0 926 676 A1 | | 6/1999 | |
| GB | 1057605 | * | 2/1967 | ................ 242/348 |

* cited by examiner

Primary Examiner—Emmanuel M. Marcelo
(74) Attorney, Agent, or Firm—Eric D. Levinson

(57) ABSTRACT

A data storage cartridge (10) includes a housing (12) having a first section (13) and a second section (14) operatively connected to each other. A first positioning member (40) and second positioning member (50) are operatively connected to the housing and are in axial alignment with each other. A leader pin (30) is positioned in the positioning members (40 and 50). Springs (60 and 70) secure the leader pin (30) in position. A flexible locking post (82) provides a snap fit in an opening (92) and provides for two perpendicular pairs of locking surfaces to form a snap fit between the sections (13 and 14).

17 Claims, 6 Drawing Sheets

DATA STORAGE CARTRIDGE HAVING A RETAINER FOR A LEADER PIN

BACKGROUND OF THE INVENTION

This invention relates generally to a data storage tape cartridge and more particularly to a data storage tape cartridge having a retainer for a leader pin and a snap fit housing proximate the leader pin.

Cartridges have been used for decades in the computer, audio and video fields. The data storage tape cartridge continues to be an extremely popular form of recording large volumes of information for subsequent retrieval and use. The data storage cartridges typically have a housing which includes a base and a cover. These two components are secured together in a number of ways including screws and sonic welding. Sonic welding is not always acceptable because it causes debris that can settle onto the tape surface and cause errors when reading or writing information. Using screws is not always possible because there is not enough room to place the screws. Further, the cartridges have a tape access opening proximate which is located the leader pin or other end of tape attachment members, on which the tape is secured. The tape is accessed through the tape access opening. The leader pin needs to be secured in the data storage cartridge. The leader pin has been secured in many ways including placing the leader pin in the base and then capturing the leader pin by the cover. One of the problems associated with such a design is that it requires proper alignment for assembly. Further, having the leader pin adjacent the tape access opening makes it difficult for a screw to be utilized in close proximity to the leader pin. Therefore, while the base and cover may be substantially fastened to each other by the means noted above, in the immediate area of the leader pin there is typically a portion of the housing which is not as securely fastened. This causes a problem during handling or if the cartridge is dropped wherein the leader pin may become dislodged because it is not held firmly in place between the cover and the base.

The present invention addresses the problems associated in the prior art noted above.

SUMMARY OF THE INVENTION

In one embodiment, the invention is a data storage cartridge having a housing with first and second sections operatively connected to form the housing. The housing defines a tape access opening. A first positioning member is operatively connected to the first section and a second positioning member is operatively connected to the second section, the positioning members are in axial alignment. An end of tape attachment member has a first end positioned in the first positioning member and a second end positioned in the second positioning member. A first spring has a first portion operatively connected to the first section and a second portion securing the end of tape attachment member in position. A second spring has a first portion operatively connected to the second section and a movable second portion securing the end of tape attachment member in position.

In another embodiment, the invention is a data storage cartridge having a housing with first and second sections. The first section has a base member and at least one sidewall, the sidewall operatively connected to the base member at an angle. The sidewall has an opening having a first locking surface and a second locking surface, the locking surfaces in perpendicular planes. A flexible locking post has a first end operatively connected to the second section and a second end. The second end has first and second locking surfaces, the locking surfaces are in perpendicular planes, wherein the locking surfaces of the opening and the post form a snap fit to operatively connect the first section to the second section.

In another embodiment, the invention is a data storage cartridge having a housing having first and second sections operatively connected to form the housing. The first section has a base member and at least one sidewall, the sidewall connected to the base member at an angle. The sidewall has an opening having a first locking surface and a second locking surface. The locking surfaces are in perpendicular planes. The housing defines a tape access opening. A first positioning member is operatively connected to the first section and a second positioning member is operatively connected to the second section, the positioning members are in axial alignment. An end of tape attachment member has a first end positioned in the first positioning member and a second end positioned in the second positioning member. A first spring has a first portion operatively connected to the first section and a movable second portion securing the end of tape attachment member in position. A second spring has a first portion operatively connected to the second section and a movable second portion securing the end of tape attachment member in position. A flexible locking post has a first end operatively connected to the second section and a second end. The second end has first and second locking surfaces. The locking surfaces are in perpendicular planes, wherein the locking surface of the opening and the post form a snap fit to operatively connect the first section to the second section.

DETAILED DESCRIPTION OF THE PREFERRED EMBODIMENT

Figure 1:
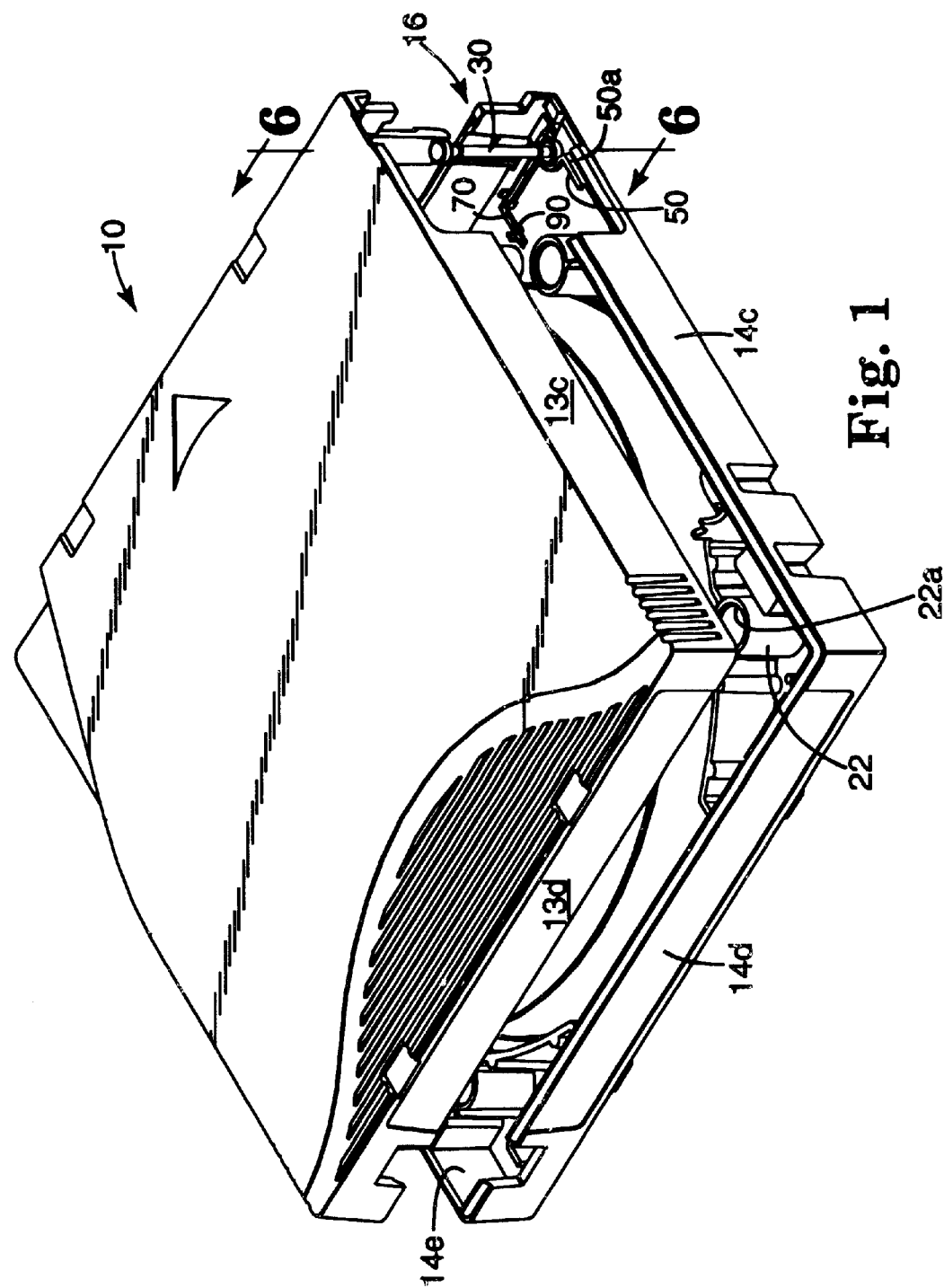
FIG. 1 is an exploded perspective view of a data tape cartridge in accordance with the present invention, viewed generally from above.
Figure 2:
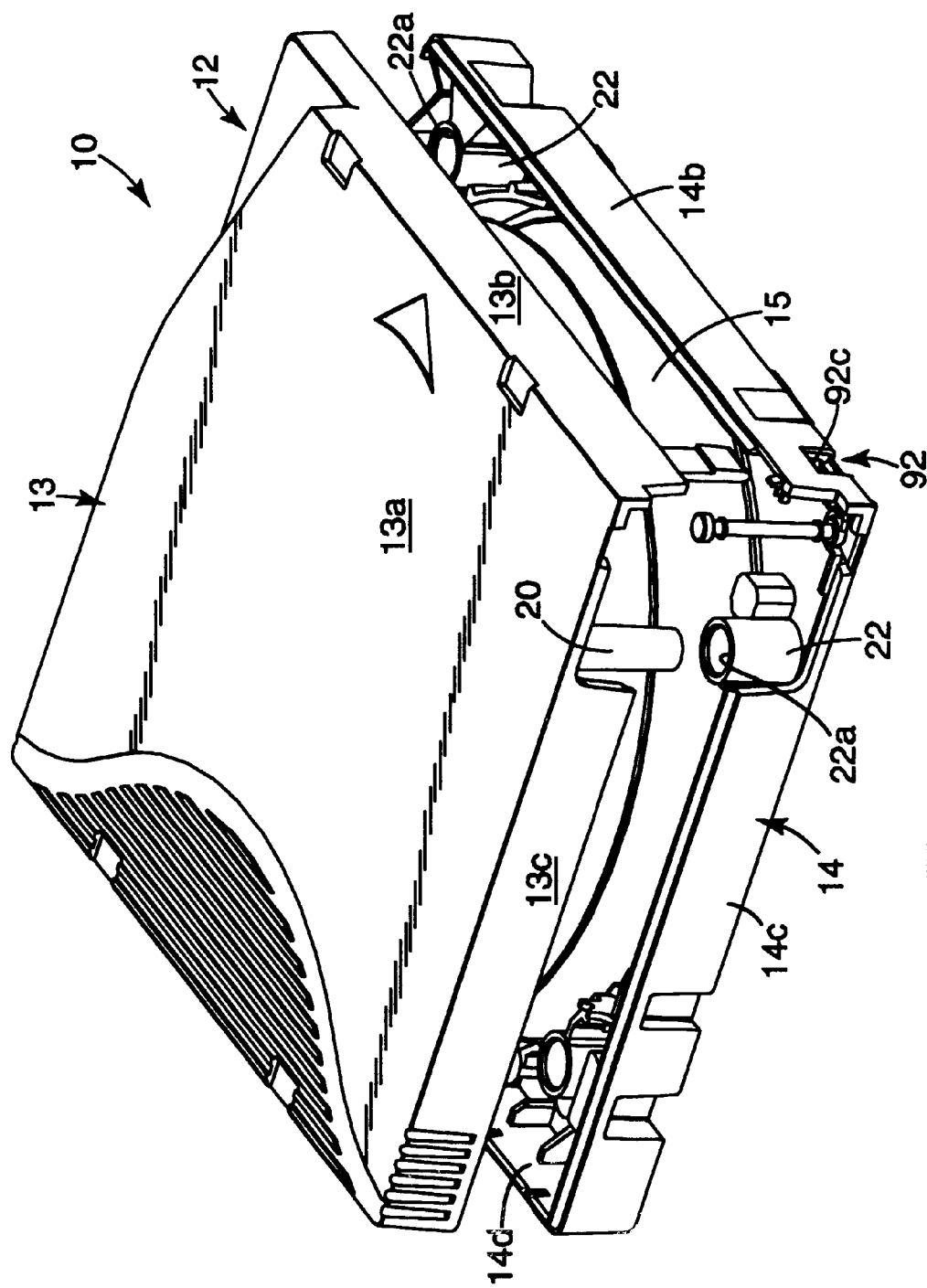
FIG. 2 is an exploded perspective view of the data cartridge shown in FIG. 1, rotated 90 degrees.

Referring to the drawings, wherein like numerals represent like parts throughout the several views, there is generally disclosed at 10 a data storage tape cartridge. Generally speaking, the data storage tape cartridge 10 includes a housing 12 having a first section 13 and a second section 14. A tape reel assembly 15 is utilized to house the storage tape (not shown). The storage tape is wound around the tape reel assembly 15.

The housing 12 is preferably sized to receive a typical tape drive (not shown). Thus, the housing 12 may be sized for use within a 5.25-inch (130 millimeter) form factor drive or a 3.5-inch (90 millimeter) form factor drive or other useful sizes. In one preferred embodiment, the first section 13 forms a cover whereas the second section 14 serves as a base. It should be understood that the directional terminology, such as "cover", "base", "upper", "lower", "top", "bottom", etc. are used for purposes of illustration only, and are in no way limiting. The first section 13 has a planar member 13a which has four sidewalls 13b–13e which depend generally at a 90-degree angle from the planar member 13a. Arcuate inner walls 17–19 are formed which define a cavity for the tape reel assembly 15. Four cylinders 20 extend from the planar member 13a. The cylinders 20 have an opening 20a at one end. The cylinders are hollow to receive a screw, as will be described more fully hereafter. An elongate brake post 21 extends upward from the planar member 13a. The brake post engages a brake button (not shown) which in turn engages the tape reel assembly 15.

The second section 14 has a planar member 14a which has four sidewalls 14b–14e which depend generally at a 90-degree angle from the planar member 14a. An aperture (not shown) is formed in the planar member 14a and provides access for a tape drive (not shown) to the tape reel assembly 15. There are three arcuate inner walls which correspond to the arcuate walls 17–19, to form a cavity for the tape reel assembly 15. Cylindrical posts 22 extend upward from the planar member 14a. There are four cylindrical posts 22 which are in alignment with the cylinders 20. The cylindrical posts 22 have an opening 22a at one end and another opening (not shown) at their other end which is formed in the planar member 14a. The cylinders 20 are sized and configured to fit inside the cylindrical posts 22. Then, when assembled, screws (not shown) are inserted through the openings of the cylinder 22 through the planar member 14a and tightened to secure the two sections together to form the housing 12. Preferably, the sections 13 and 14 are formed as separate integral moldings from a suitable material such as polycarbonate. The data storage cartridge described thus far is a typical data storage cartridge, the construction of which is well known in the art.

A tape access opening 16 is formed in the housing 12. The opening 16 is formed from openings formed in the sidewalls 13c and 14c. The opening 16 provides access to the leader pin 30. The leader pin 30 is an end of tape attachment member and is generally dumbbell shaped and has an elongate shaft 31 having cylindrical ends 32 and 33 connected thereto. The cylindrical ends 32 and 33 have diameters which are larger than the diameter of the shaft 31. While this invention is being described as the preferred embodiment having a leader pin 30, it is understood that one skilled in the art would also understand that it may be used with other end of tape attachment members, such as a leader block.

A first positioning member 40 is operatively connected to the first section 13 and a second positioning member 50 is operatively connected to the second section 14. A preferred embodiment, the positioning members 40, 50 are an integral portion of their respective sections 13, 14. The positioning members 40, 50 have a base member 40a, 50a operatively connected to an arcuate member 40b, 50b. As shown, the arcuate member 40b, 50b is generally in the shape of a semicircle. The arcuate members 40b, 50b are sized and configured to mate with the size and configuration of the cylindrical ends 32, 33. While other configurations are possible, the arcuate configuration allows for the easy insertion of the leader pin 30 without having to worry about the orientation of the leader pin 30. The arcuate members 40b, 50b are in axial alignment with each other so that the leader pin 30 is generally perpendicular to the planar members 13a, 14a.

A first spring 60 is operatively conected to the first conection 13 and second spring 70 is operatively connected to the second section 14. Guides 80, 81 and 90, 91 are operatively connected to their respective sections 13 and 14. The guides 80, 81 and 90, 91 form channels in witch springs 60 and 70 are positioned. The guides are preferably formed as an integral portion of the section 13, 14. The springs 60, 70 are generally L-shaped and have a first portion and a second portion. A base member 60a, 70a is the first portion and an elongate member 60b, 70b forms the second portion. The elongate member 60b has a first end 60c, 70c which is operatively connected to the base member 60a, 70a and a second end 60b, 70b which forms the second portion of the spring 60, 70. The second end 60b, 70b is arcuate in shape. Preferably, the springs 60, 70 are each constructed from a single spring material. The springs 60, 70 are placed in the guides 80, 81 and 90, 91 and are operatively connected to the sections 13, 14. They may be operatively connected by suitable means such as sonic welding or hot staking. This connection serves as anchoring the first portion 60a, 70a of the springs 60, 70 to the sections 13, 14. The second end 60b, 70b is not connected to the sections 13, 14 and is positioned so as to apply a force to the leader pin 30 to hold the leader pin 30 in place. The outer circumference of the ends 32, 33 push the second ends 60b, 70b aside as the leader pin 30 is seated in the positioning members 40, 50. Then, the second end 60d, 70d provides a positive force to capture the leader pin 31 and hold it in position. The leader pin 30 may then easily be removed by simply pulling away from the arcuate member 40b and then reinserted by reversing the movement.

Figure 3:
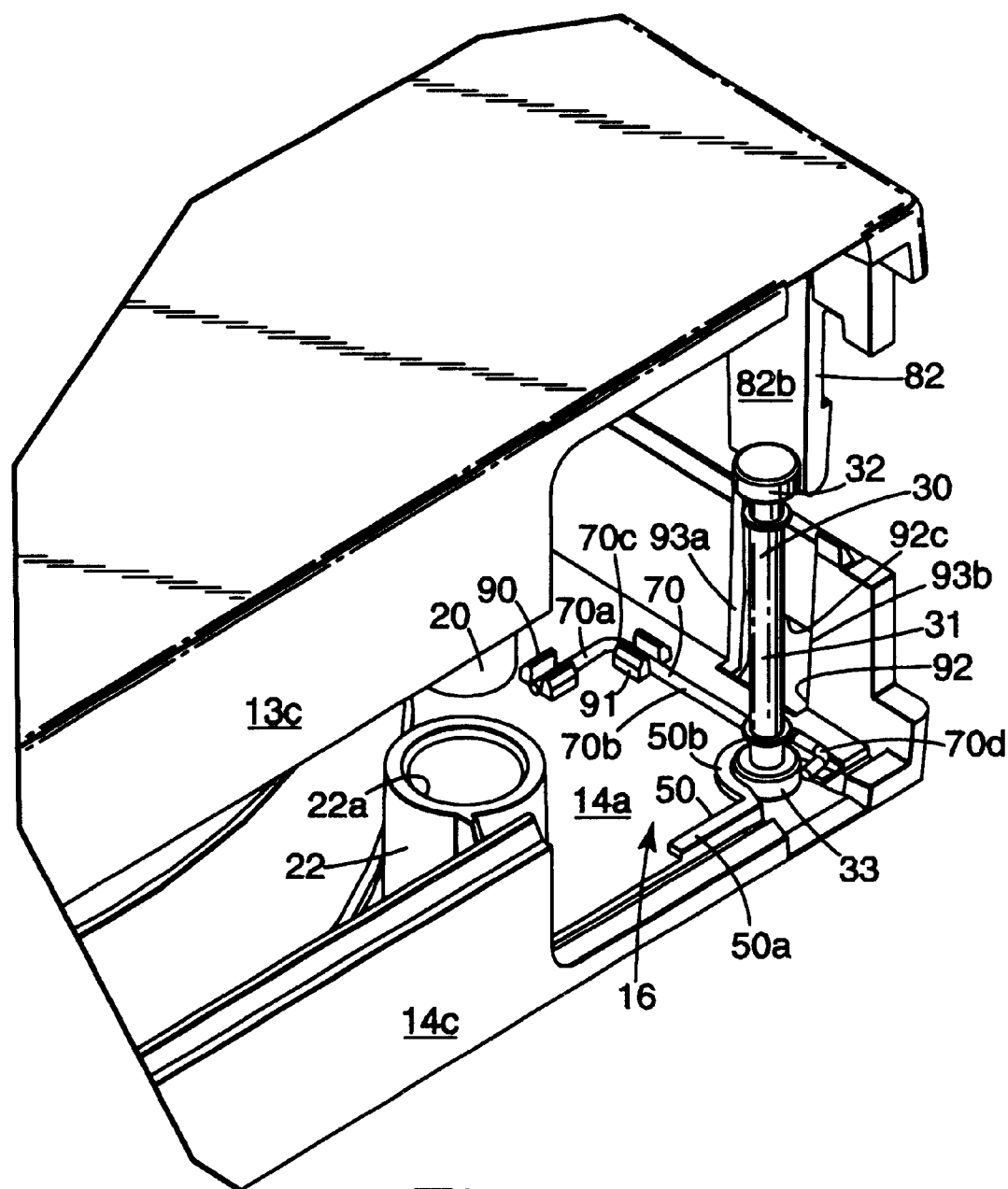
FIG. 3 is an enlarged perspective view of a portion of the cartridge shown in FIG. 1.
Figure 4:
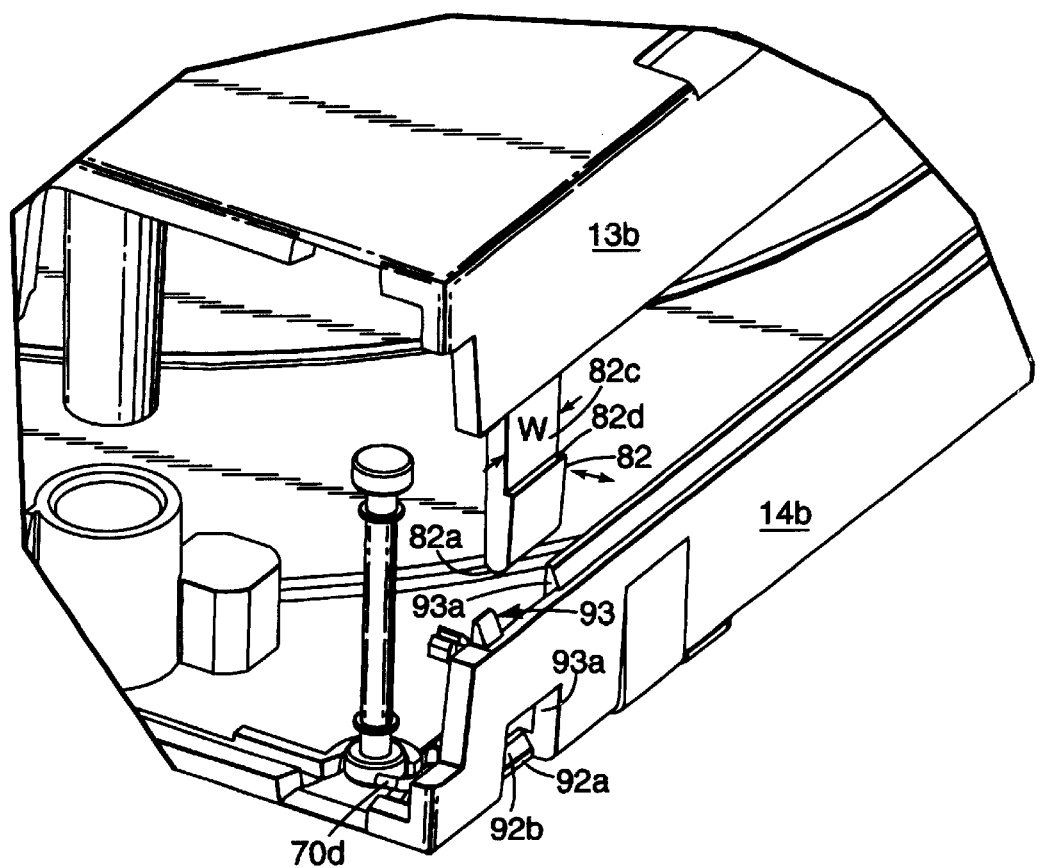
FIG. 4 is an enlarged perspective view of the cartridge shown in FIG. 2.
Figure 5:
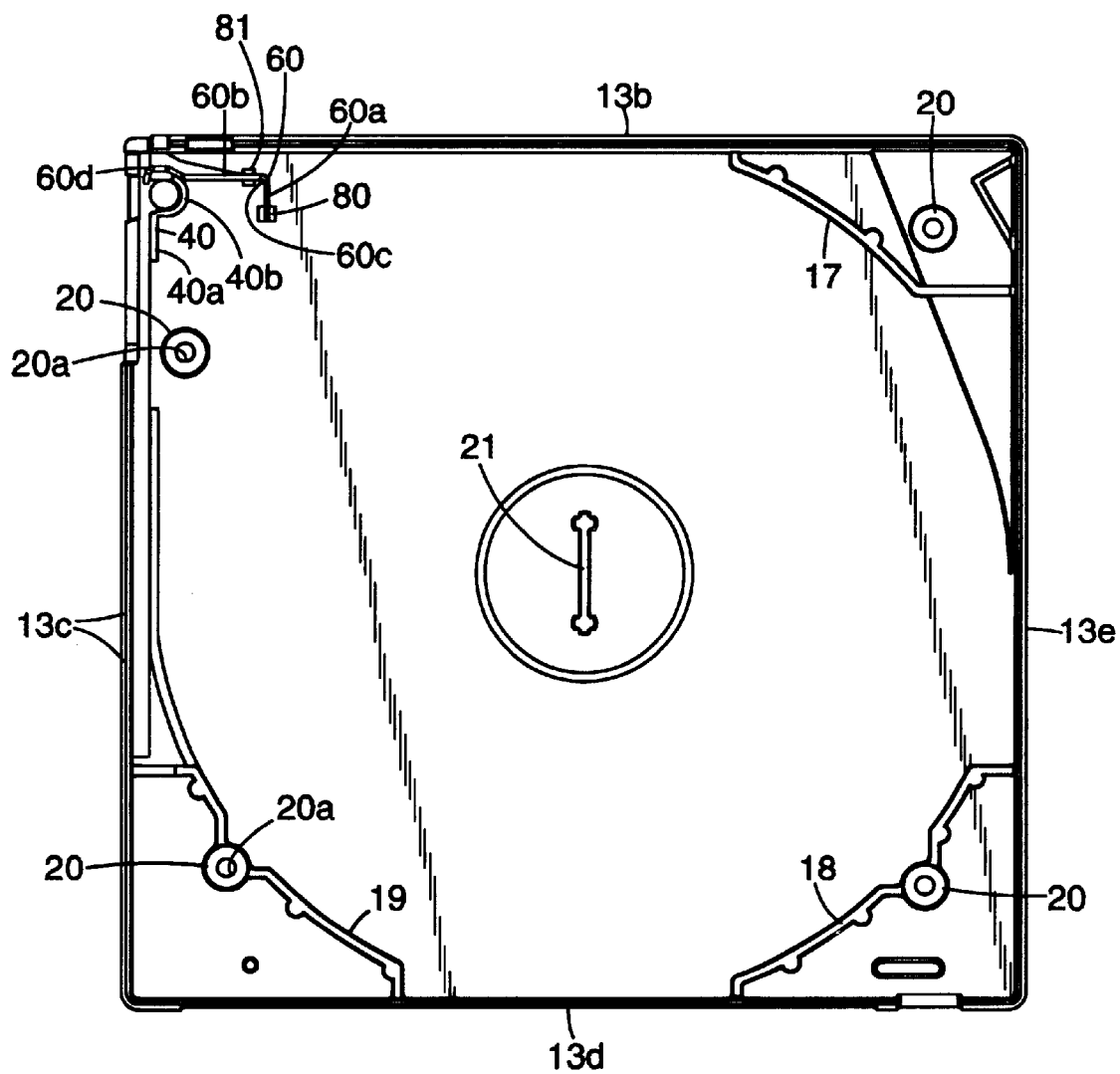
FIG. 5 is an inside plan view of a portion of the cartridge shown in FIG. 1.
Figure 6:
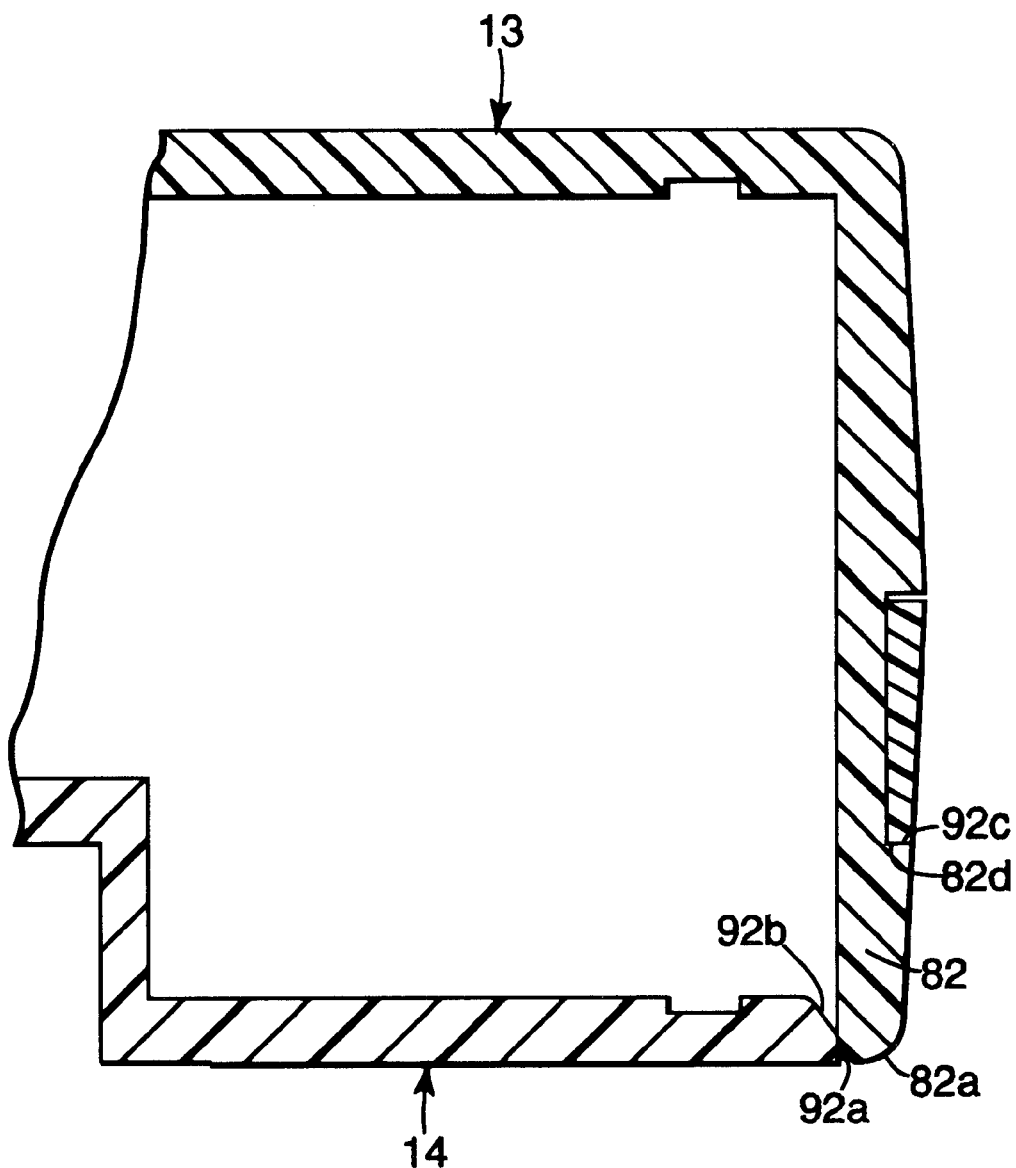
FIG. 6 is a partial (non-exploded) cross-sectional view of the data cartridge shown in FIG. 1.

As best seen in FIGS. 3, 4 and 6, there is provided a lock to further secure a portion of sections 13 and 14 together proximate the tape access opening 16. A flexible post 82 is operatively connected to the sidewall 13b. Preferably, the post 82 is an integral portion of the molding of the section 13. The post 82 is rigid with respect to movement sideways, but is flexible in a direction as shown by the arrows in FIG. 4. That is, it is flexible in a direction perpendicular to the sidewall 14b. Typically, the end 82a would be capable of moving approximately ⅛ inch or more relative to the sidewalls 13b or 14b, although it is recognized that flexibility to this great of an extent is not required. The post 82 has a generally planar back surface 82b. The end 82a has a slight curvature to assist in obtaining a snap fit, as will be described more fully hereafter. A notch is formed in the top portion of the flexible post 82. The notch has a generally planar surface 82c which is generally parallel to the planar back surface 82b and the notch has a locking surface 82d which is generally perpendicular to the planar surface 82c. The post 82 has a width "W" which is approximately 5 millimeters wide. The post 82 is sized and configured to form a snap fit with an opening 92 which is formed in the sidewall 14b. A slot 93 is formed in the sidewall 14b and has two perpendicular walls 93a and 93b. The sidewalls 93a and 93b extend to the bottom of the planar surface 14a and also form the sides of the opening 92. The width of the slot 93 and opening 92 is only slightly larger than the width "W" of the flexible post 82. The extra width is approximately 0.1 millimeters to 0.2 millimeters. The bottom of the opening 92 has a first wall 92a which is generally parallel to the surfaces 82b and 82c and perpendicular to locking surface 82d. An angled guide wall 92b is at an angle, and is preferably from 30 to 60 degrees, to the first wall 92a and extends to the inside surface of the planar member 14a. The opening 92 has a top wall 92c which is generally perpendicular to the surfaces 82b and 82c.

In assembling the sections 13 and 14 together, it is preferable to first secure the snap fit, as will be described hereinafter, before the screws are assembled through the cylinder 22 and cylinder posts 20. The post 82 is positioned above the slot 93 and the side walls 92a and 92b of the slot guide the post 82 as it is moved downwards towards the opening 92. The bottom 82a of the post 82 contacts the angled guide wall 92b. This forces the bottom of 82a of the post 82 outward as it is pushed downward. The height of the opening 92 is sized to be the height of the lower section (below surface 82d) of the locking post 82. Therefore, once the locking surface 82d passes underneath the top wall 92c, the post 82 has a snap fit with the opening 92. Two pairs of locking surfaces are formed which are perpendicular to each other. The first pair of locking surfaces are locking surface 82d and the top wall 92c. The second pair of locking surfaces are first sidewall 92a and the planar back surface 82b.

The snap fit provided by the post 82 and opening 92 more firmly secures the sections 13 and 14 together, thereby providing a more secure fastening in the area of the leader pin 30. The leader pin 30 is sized to have a height substantially the same as the distance between the planar members 14a and 13a. Therefore, the leader pin 30 may easily be slid into position into the positioning members 40 and 50. As the leader pin 30 moves into the positioning members 40 and 50, the cylindrical ends 32, 33 push the arcuate ends 60d, 70d away to allow the cylinder ends 32 and 33 to be positioned in the positioning members 40, 50. Then, the spring force of the second ends 60d, 70d provides a positive force to capture and hold the leader pin 30 in position.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A data storage cartridge comprising:
   a) a housing having a first section and a second section operatively connected to form the housing;
   b) the housing defining a tape access opening;
   c) a first positioning member operatively connected to the first section and a second positioning member operatively connected to the second section, the positioning members in axial alignment;
   d) an end of tape attachment member having a first end positioned in the first positioning member and a second end positioned in the second positioning member;
   e) a first spring having a first portion operatively connected to the first section and a moveable second portion securing the end of tape attachment member in position; and
   f) a second spring having a first portion operatively connected to the second section and a moveable second portion securing the end of tape attachment member in position.

2. The data storage cartridge of claim 1, wherein the end of tape attachment member is a leader pin.

3. The data storage cartridge of claim 2, wherein the positioning members are arcuate.

4. The data storage cartridge of claim 3, wherein the arcuate members have an opening proximate the tape access opening to allow the leader pin to be inserted through the access opening.

5. The data storage cartridge of claim 2, wherein the springs are generally L-shaped having a base member and an elongate member, the elongate member having a first end operatively connected to the base member and a second end forming the second portion.

6. The data storage cartridge of claim 5, wherein the first portions of the springs are operatively connected to the sections proximate both their base members and elongate members.

7. A data storage cartridge comprising:
   a) a housing having a first section and a second section;
   b) the first section having a base member and at least one side wall, the side wall operatively connected to the base member at an angle;
   c) the side wall having an opening having a first locking surface and a second locking surface, the locking surfaces in perpendicular planes; and
   d) a flexible locking post having a first end operatively connected to the second section and a second end, the second end having first and second locking surfaces, the locking surfaces in perpendicular planes, wherein the locking surfaces of the opening and the post form a snap fit to operatively connect the first section to the second section.

8. The data storage cartridge of claim 7, further comprising a slot formed in the side wall, the slot forming a first guide for properly aligning the post.

9. The data storage cartridge of claim 7, further comprising an angled bottom surface forming in opening, the angled bottom surface for guiding the post into a snap fit position.

10. A data storage cartridge comprising:
    a) a housing having a first section and a second section operatively connected to form the housing, the first section having a base member and at least one sidewall, the sidewall connected to the base member at an angle and the sidewall having an opening having a first locking surface and a second locking surface, the locking surfaces in perpendicular planes;
    b) the housing defining a tape access opening;
    c) a first positioning member operatively connected to the first section and a second positioning member operatively connected to the second section, the positioning members in axial alignment;
    d) an end of tape attachment member having a first end positioned in the first positioning member and a second end positioned in the second positioning member;
    e) a first spring having a first portion operatively connected to the first section and a moveable second portion securing the end of tape attachment member in position;
    f) a second spring having a first portion operatively connected to the second section and a moveable second portion securing the end of tape attachment member in position; and
    g) a flexible locking post having a first end operatively connected to the second section and a second end, the second end having first and second locking surfaces, the locking surfaces in perpendicular planes, wherein the locking surfaces of the opening and the post form a snap fit to operatively connect the first section to the second section.

11. The data storage cartridge of claim 10, wherein the end of tape attachment member is a leader pin.

12. The data storage cartridge of claim 11, wherein the positioning members are arcuate.

13. The data storage cartridge of claim 11, wherein the arcuate members have an opening proximate the tape access opening to allow the leader pin to be inserted through the access opening.

14. The data storage cartridge of claim 13, wherein the springs are generally L-shaped having a base member and an elongate member, the elongate member having a first end operatively connected to the base and a second end forming the second portion.

15. The data storage cartridge of claim 14, wherein the first portions of the springs are operatively connected to the sections proximate both their base member and elongate member.

16. The data storage cartridge of claim 15, further comprising a slot formed in the side wall, the slot forming a first guide for properly aligning the post.

17. The data storage cartridge of claim 16, further comprising an angled bottom surface forming in opening, the angled bottom surface for guiding the post into a snap fit position.

* * * * *